United States Patent Office 3,275,353
Patented Sept. 27, 1966

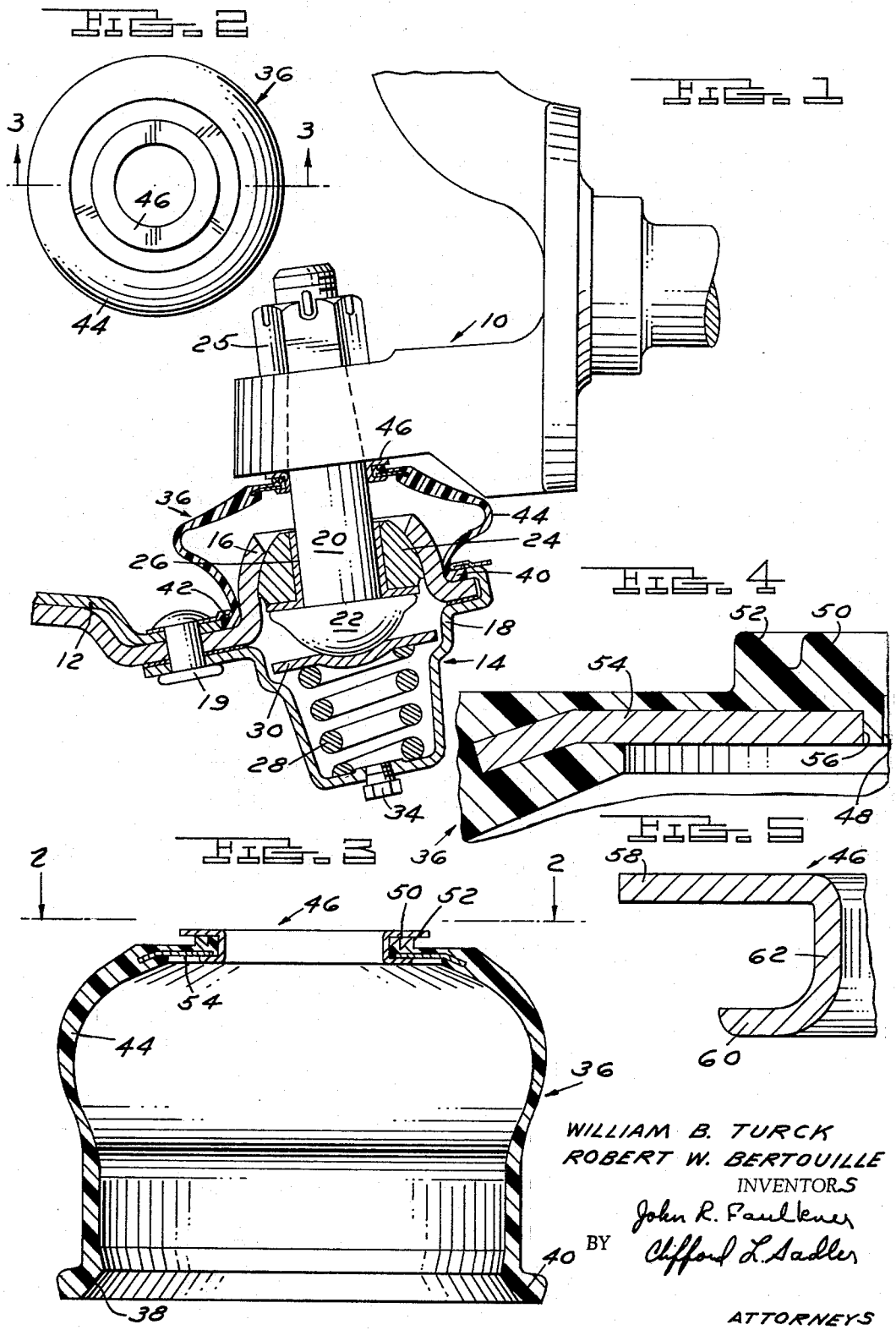

3,275,353
BALL AND SOCKET JOINT SEAL
William B. Turck, Dearborn, Mich., and Robert W. Bertouille, Fairport, N.Y., assignors to Ford Motor Company, Dearborn, Mich., a corporation of Delaware
Filed Jan. 27, 1964, Ser. No. 340,146
5 Claims. (Cl. 287—90)

The present invention relates generally to ball and socket type joints, and more particularly to means for sealing such constructions.

Ball and socket joints provide an arctiulated connection between two relatively movable members. It is common practice to provide joints of this type in vehicle suspension systems such as at the connection between the suspension arms and the wheel spindle. Ball joints are also used in the steering linkage.

A ball joint usually comprises a spherical or semi-spherical socket and a stud with a one- or two-piece spherical head that is seated in the socket. The joints are lubricated with grease to permit low friction movement. In order to retain the lubricant within the socket and prevent the entry of dirt that might damage the bearing surfaces, a boot type seal is usually provided. A boot seal is usually formed of a flexible material such as rubber in an annular shape with a small opening at one end surrounding the stud and a large opening surrounding the socket.

In automotive suspension systems, it has become a practice to provide prelubricated ball and socket joints containing a grease of improved quality that will retain good lubricating characteristics for extended usage beyond the heretofore conventional 1000-mile servicing. In order to accommodate a ball joint construction having such lubrication, superior means must be provided to retain the grease and to prevent its contamination.

In accordance with this need, it is an object of the present invention to provide a boot type seal for a ball joint having superior sealing characteristics.

These and further objects of the present invention will be more fully comprehended from the following discussion and the accompanying drawings, in which:

FIGURE 1 is an elevational view, partly in section, of a portion of a vehicle suspension system having a ball joint seal constructed in accordance with this invention;

FIGURE 2 is a top plan view of the ball joint seal taken along section lines 2—2 of FIGURE 3;

FIGURE 3 is an elevational view, partly in section, taken along section lines 3—3 of FIGURE 2.

FIGURE 4 is an enlarged elevational view showing a portion of the seal of FIGURE 3; and, FIGURE 5 is an elevational view of the ferrule portion of the seal shown in FIGURES 1 and 3.

Referring now to the drawings for a complete understanding of the invention, FIGURE 1 discloses a portion of a vehicle suspension that includes a wheel spindle 10 and a suspension arm 12. A ball joint assembly 14 rotatably and tiltably connects the spindle 10 with the arm 12. The ball joint assembly 14 includes upper and lower socket portions 16 and 18 that are secured to the end of the arm 12 by rivets 19.

A stud member 20 has a hemispherical head 22 positioned within the socket portions 16, 18. An annular bearing member 24 cooperates with the head 22 to form the ball portion of the joint. The shank of the stud 20 is secured to the wheel spindle 10 by a nut 25.

A hat-shaped washer 26 is interposed between the annular member 24 and the head portion 22. The washer 26 forms a bearing to accommodate steering movement of the spindle 10.

A hemispherical internal bearing surface is provided within the socket portion 16 that is slidably engaged by the annular bearing member 24 to accommodate tilting motion of the joint during jounce and rebound suspension movement.

A coil spring 28 and a washer 30 preloaded the joint 14 and keeps the bearing surfaces in their proper position. A threaded plug 34 is provided in the end of the socket portion 18 to permit the ball joint assembly 14 to be charged with a lubricant.

A flexible boot seal assembly 36 surrounds the socket portion 16 and stud 20. It is the purpose of this seal to retain lubricant within the ball joint assembly 14 and to prevent the entry of water, dirt and other contaminants.

The seal 36 is an annular member having a large opening 38 at one end that is surrounded by an enlarged lip 40. This lip 40 is adapted to be trapped by a sheet metal retaining piece 42. The body portion of the seal 36 bulges outwardly at 44 so that material is available for flexing during tilting movement.

A ferrule 46 surrounds a small opening 48 that is axially spaced from the large opening 38. A pair of annular ridges 50 and 52 are concentrically positioned outwardly from the periphery of the small opening 48 and extending in a direction away from the large opening 38. An annular metal piece 54 is embedded in the rubber and serves as reinforcement for the ridges 50 and 52. The reinforcement member 54 has a central opening 56 that is spaced outwardly of the opening 48.

The ferrule 46 has a channel-shaped cross section with a large upper radial flange 58 and a small lower radial flange 60. The flanges 58 and 60 are joined by a cylindrical portion 62. The channel formed by the flanges 58, 60 and cylindrical portion 62 surround the opening 48. The flanges 58, 60 are so spaced that the ridges 50, 52 are slightly crushed and the lower surface of the reinforcement piece 54 is in sliding contact with the small flange 60.

The seal 36 is positioned with the lip 40 positioned by the retainer 42 as previously described. The ferrule 46 engages the shank of the stud 40 by a press fit. During steering movement of the spindle 10, which occurs about the axis of the stud 20, the ferrule 46 will rotate with respect to the remainder of the seal 36. Sliding movement will occur between the ridges 50, 52 and the upper flange 58 and between reinforcement 54 and the lower flange 60.

With this construction, a positive seal is provided at the upper end that is not dependent upon the finish of the stud 20. The desired sealed engagement between the ferrule 46 and the small opening 48 is achieved prior to the assembly of the suspension. In addition, turning or steering movement of the spindle 10 does not cause wrinkling of the body of the seal 36, only sliding movement.

Modifications and alterations of this invention may occur to those skilled in the art that will come within the scope and spirit of the following claims.

We claim:

1. A ball joint assembly having ball stud and socket parts, an annular boot seal having a large open end, a metal retainer holding said end in sealed engagement with said socket part, said seal having a smaller open end in sealed engagement with said ball stud part, said smaller end comprising a sheet metal ferrule of annular shape having a channel-shaped cross section and secured to said ball stud part, said seal including a flexible body having a small opening concentrically fitted within the channel portion of said ferrule, said flexible body having at least two upstanding concentric deformable ridges engaging one wall of said ferrule, a sheet metal reinforcement embedded in said body of said seal and providing a flat surface in slidably engaging the other wall of said ferrule.

2. A ball joint assembly having ball stud and socket parts, an annular boot seal having a large open end in sealed engagement with said socket part and a smaller open end in sealed engagement with said ball stud part, said small end comprising a sheet metal ferrule having a channel-shaped cross section secured to said ball stud part, said seal including a flexible body having a small opening fitted within the channel portion of said ferrule, said flexible body having at least two upstanding concentric ridges engaging one wall of said ferrule, a sheet metal reinforcement embedded in said body of said seal and slidably engaging the other wall of said ferrule.

3. A ball and socket type joint having a spherical socket with a stud member protruding from said socket, a flexible seal surrounding said stud and having an opening therein in engagement with said socket, a sheet metal annular ferrule having a channel-shaped cross section secured to said stud, said seal including a flexible body, a small opening concentrically fitted within the channel portion of said ferrule, said flexible body having at least two upstanding concentric ridges engaging one wall of said ferrule, a sheet metal reinforcement embedded in said body of said seal and slidably engaging another wall of said ferrule.

4. A ball and socket type joint having a spherical socket with a stud member protruding from said socket, a flexible seal surrounding said stud and having an opening therein in engagement with said socket, a sheet metal ferrule of annular shape secured to said stud, said ferrule having spaced apart flat radial flanges, said seal including a flexible rubber body portion with an opening concentrically fitted about said ferrule and between said flanges, one of said flanges having a flat surface facing said rubber body portion, said rubber body portion having at least one upstanding compressible concentric ridge slidably engaging said flat surface of said one radial flange, and an annular reinforcing ring embedded in said rubber body portion and spaced from said concentric ridge.

5. A ball and socket type joint having a spherical socket with a stud member protruding from said socket, a flexible seal surrounding said stud and having an opening therein in engagement with said socket, a sheet metal ferrule of annular shape secured to said stud, said seal including a flexible body portion with an opening concentrically fitted about said ferrule, said ferrule having a radial flange, said rubber body having at least one upstanding concentric ridge engaging said radial flange of said ferrule, a sheet metal reinforcement embedded in said body beneath said ridge, said ferrule having a second radial flange in sliding engagement with said reinforcement.

References Cited by the Examiner

UNITED STATES PATENTS

| | | |
|---|---|---|
| 2,197,037 | 4/1940 | Gardner. |
| 2,211,817 | 8/1940 | Hufferd et al. |
| 3,073,617 | 1/1963 | Schultz. |
| 3,090,628 | 5/1963 | Giulietti _____ 277—94 |

FOREIGN PATENTS

| | | |
|---|---|---|
| 925,328 | 4/1955 | Germany. |
| 949,966 | 2/1964 | Great Britain. |

CARL W. TOMLIN, *Primary Examiner.*

A. V. KUNDRAT, *Assistant Examiner.*